United States Patent

[11] 3,566,840

[72] Inventor Allan H. Willinger
 New Rochelle, N.Y.
[21] Appl. No. 757,265
[22] Filed Sept. 4, 1968
[45] Patented Mar. 2, 1971
[73] Assignee Metaframe Corporation
 Maywood, N.J.

[54] AQUARIUM AUXILIARY CONTAINER
 4 Claims, 10 Drawing Figs.
[52] U.S. Cl. ............................................. 119/5, 210/169
[51] Int. Cl. ............................................. A01k 63/00
[50] Field of Search ............................................. 119/5; 210/169

[56] References Cited
UNITED STATES PATENTS
3,302,789  2/1967  Holt .............................. 119/5X
3,468,288  9/1969  Cassil .............................. 119/5

Primary Examiner—Hugh R. Chamblee
Attorney—Friedman & Goodman

ABSTRACT: An auxiliary container having a mounted position within an aquarium tank which compactly houses a pump and filter assembly and also forms the fluid connections for an efficiently operating water recirculation filtration system of which the pump and filter assembly are integral parts. The filter assembly is additionally readily removable for replacement of the filter material and, when replaced, readily establishes the necessary fluid connections for efficient operation of the filtration system.

PATENTED MAR 2 1971

INVENTOR.
ALLAN H. WILLINGER
By Friedman & Goodman
ATTORNEYS

PATENTED MAR 2 1971 3,566,840

INVENTOR.
ALLAN H. WILLINGER

ATTORNEYS

PATENTED MAR 2 1971

INVENTOR.
ALLAN H. WILLINGER
BY
Friedman Goodman
ATTORNEYS

AQUARIUM AUXILIARY CONTAINER

The present invention relates generally to aquarium accessories, and more particularly to a housing or container for a pump and filter assembly of a recirculating water filtration system.

An essential part of an aquarium is an efficiently operating filtration system which effectively cleans the continuously circulated water stored within the aquarium tank. According to present practice, this essential accessory is commonly satisfied by little more than providing an appropriate pump having rudimentary fluid connections for recirculating the water in cleaning association with a filter and, as such, the present practice is not entirely satisfactory. Specifically, embodiments exemplifying the present practice do not particularly facilitate filter replacement, nor do they significantly contribute to the aesthetic and neat appearance of the aquarium, to mention but a few of their inadequacies.

Broadly, it is an object of the present invention to provide an improved pump and filter assembly housing or container overcoming the foregoing and other shortcomings of the prior art. Specifically, it is an object to provide a container which not only achieves a compact stored arrangement for the pump and filter assembly but also efficiently establishes the necessary fluid connections in a recirculating water system using the same.

A container for an aquarium pump and filter assembly demonstrating objects and advantages of the present invention includes a rectangular body, mountable in the open top of the aquarium tank, having separate compartments for these elements and wherein the seated position of the filter assembly within its designated compartment automatically achieves the necessary fluid connections for continuous water recirculation by the pump of the stored body of water in cleaning association with the filter material of the filter assembly.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
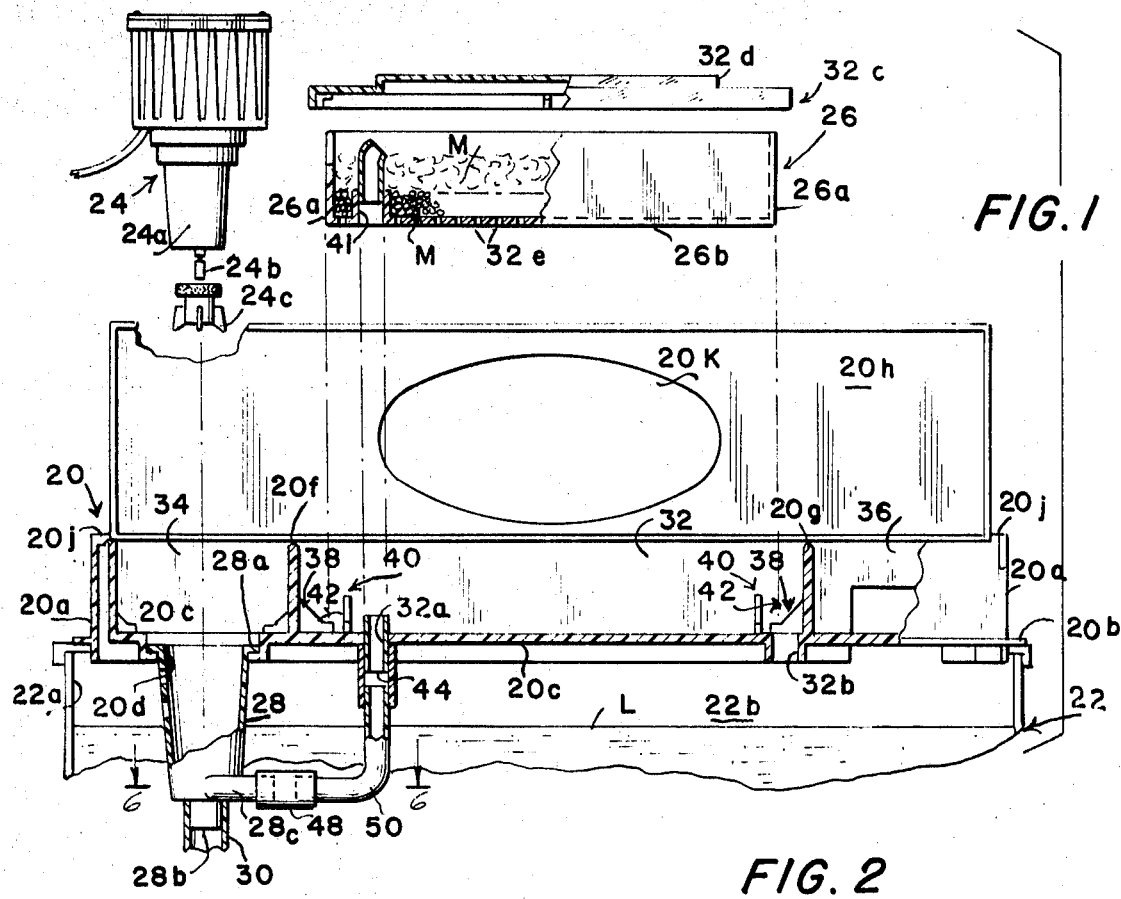
FIG. 1 is an exploded front elevational view of an aquarium auxiliary container for a pump and filter assembly, portions thereof being broken away and in section to better illustrate internal structural features thereof.
Figure 2:
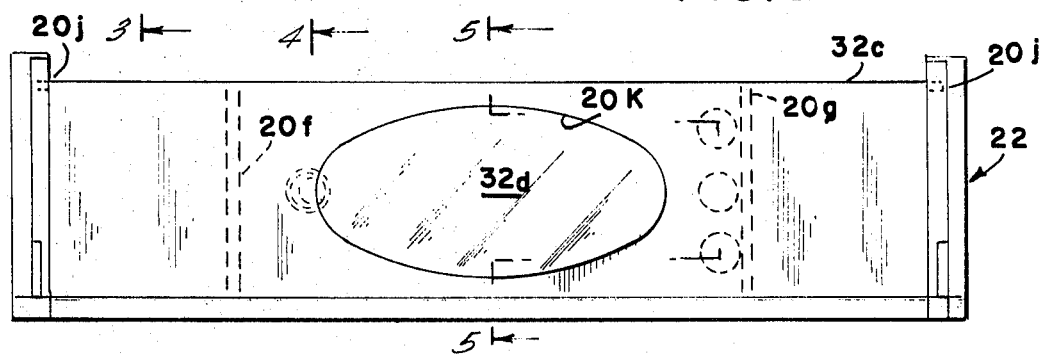
FIG. 2 is a plan view of the container illustrating still further structural features.
Figure 8:
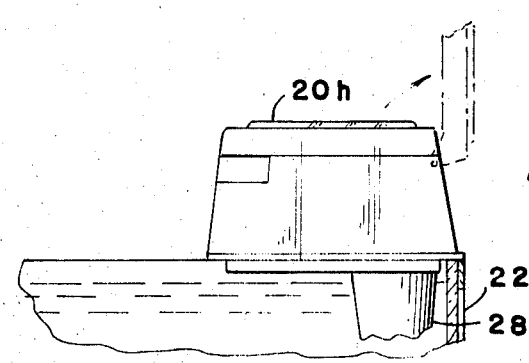
Figure 3:
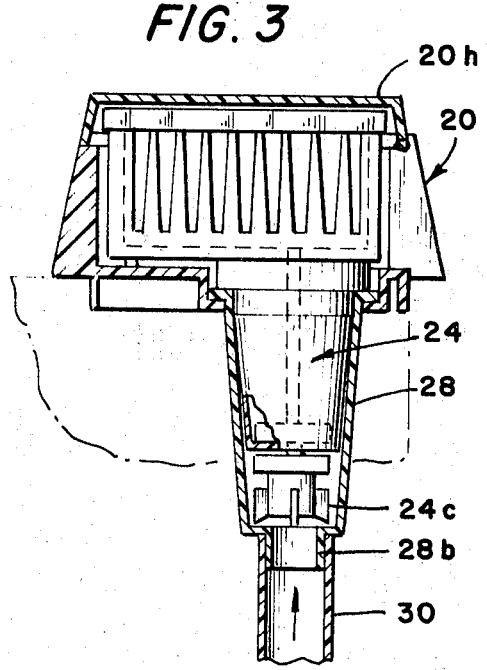
Figure 4:
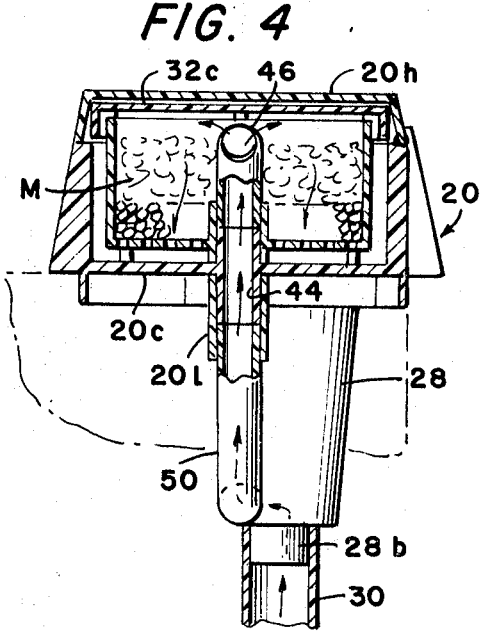
Figure 5:
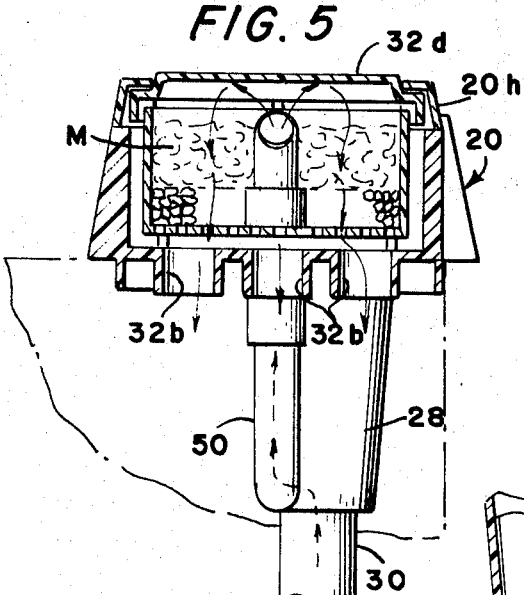
Figure 6:
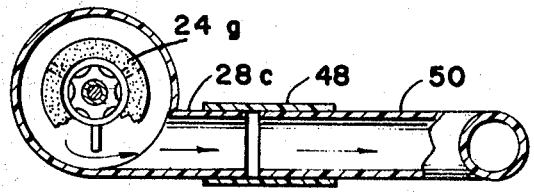
Figure 7:
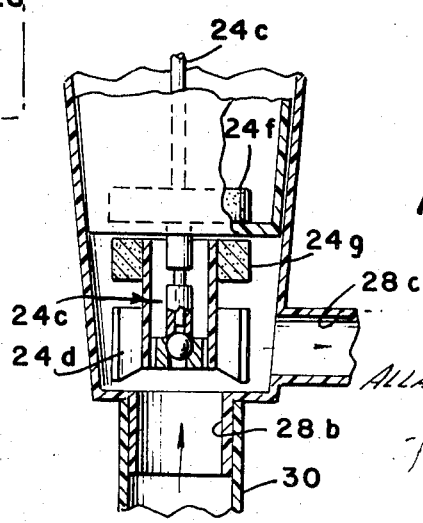
Figure 9:
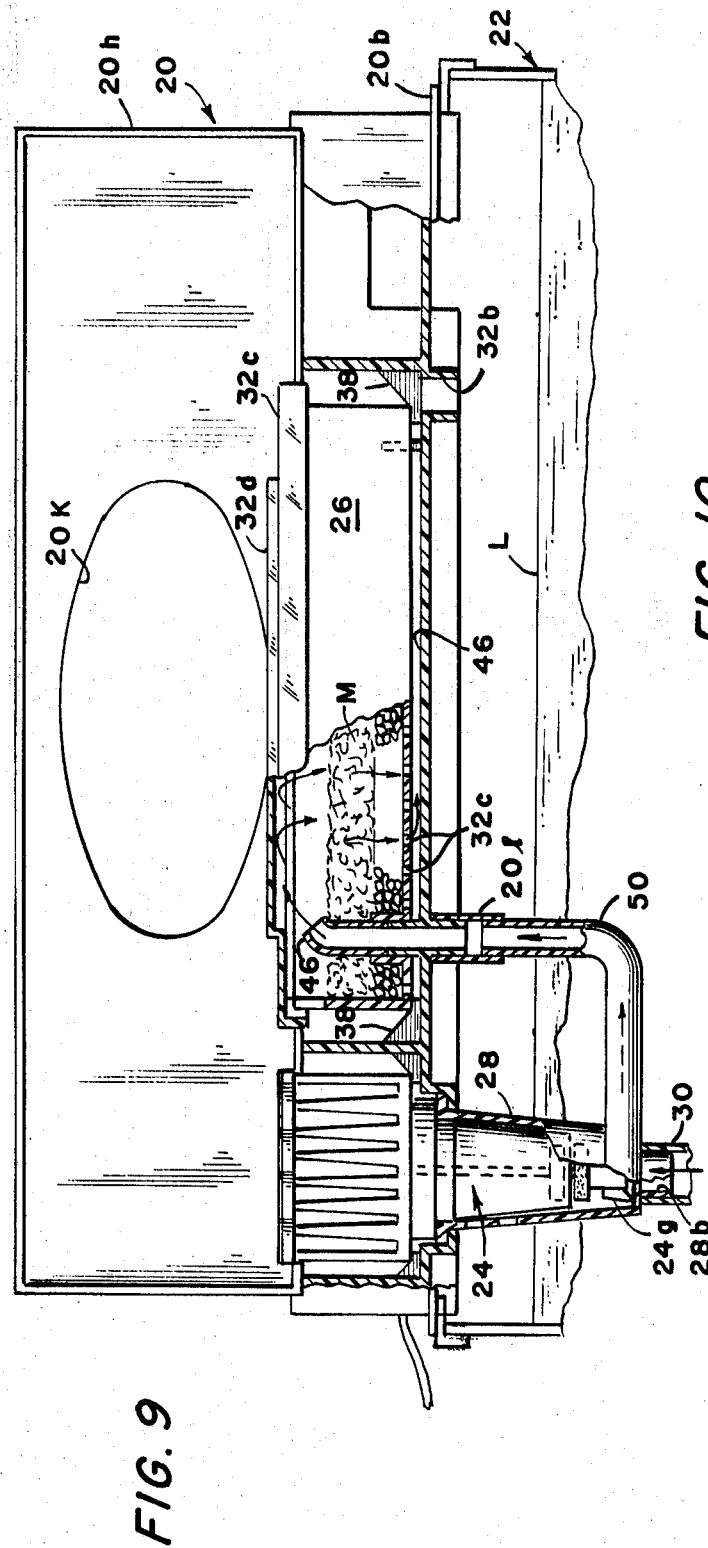
Figure 10:
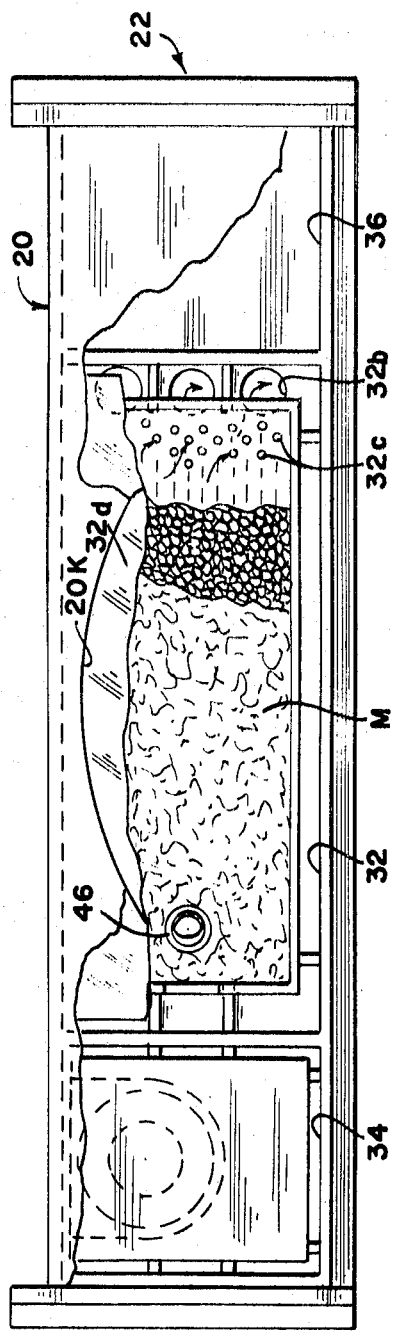

FIGS. 3, 4 and 5 are side elevational views, on a slightly enlarged scale, taken in section on lines 3—3, 4—4 and 5—5 of FIG. 2, respectively, FIG. 3 showing details of the pump, and FIGS. 4, 5 details of the filter assembly;

FIG. 6 is a plan view, on an enlarged scale, taken in section on lines 6—6 of FIG. 1 illustrating structural features of the pump and of the conduit connected therefrom to the filter assembly;

FIG. 7 is a partial elevational view, in section, of the pump impeller;

FIG. 8 is similarly a partial elevational view with portions in section, but of the auxiliary container;

FIG. 9 is an elevational view similar to FIG. 1, but illustrating the pump and the filter assembly in their assembled conditions within the auxiliary container; and FIG. 10 is a plan view similar to FIG. 2, but showing the various parts in their assembled condition and with the upper cover of the filter assembly partially broken away to illustrate internal structural features.

Reference is now made to the drawings and in particular to FIGS. 1, 9 wherein there is shown an auxiliary container, generally designated 20, in its seated position on the upper peripheral edge of walls 22 of a conventionally constructed aquarium tank, the lower depending portion of the auxiliary container 20 extending through the tank upper opening 22a to a position below the normal waterline L of the water stored within the tank interior 22b. The container 20, as will be described in greater detail herein, serves in part as a housing for a water pump 24 and for a self-contained filter assembly herein generally designated 26, and in part forms fluid passages and the like for a water filtering circulation system in which the pump 24 and filter assembly 26 are integral parts.

The auxiliary container 20, as best shown in FIGS. 2, 8 in conjunction with FIGS. 1, 9, has an overall generally rectangular shape including sidewalls 20a having a laterally extending mounting lip 20b which, as previously noted, is used to seat the container in the open end 22a of the tank 22 such that a bottom wall 20c thereof faces the tank interior 22b. At its left end, as viewed in FIGS. 1, 9, bottom wall 20c has a circular opening 20d and an integrally molded circular shoulder 20e concentric thereto which, in practice, accommodates a circular lip 28a of a generally conical housing member 28 for the motor 24. At the lower depending smaller diameter end of the housing member 28 there is a vertically oriented housing inlet 28b which advantageously has attached thereto a flexible conduit 30 which normally occupies a position below the water line L and also a horizontally oriented housing outlet 28c. Motor 24 will be understood to have a conventional hermetically sealed construction including the lower depending section 24a appropriately tapered and sized to be accommodated in the housing member 28.

As best shown in FIG. 7, a stationary depending pin 24b on the bottom wall of the lower motor portion 24a rotatably mounts, as at 24c, a pump impeller 24d advantageously located in communication with the housing member inlet 28b and outlet 28c. Consistent with the hermetic construction, motor 24 includes a drive shaft 24e having a magnet 24f at the lower end thereof which, in a well understood manner, cooperates with the magnet 24g of the impeller 24d to complete a driving connection between the motor and the impeller.

Returning again to the construction of the auxiliary container 20, as shown in FIGS. 1, 2, a pair of spaced upstanding transverse walls 20f, 20g, delineate a medial filter assembly compartment 32 within the interior of the container 20, the left wall 20f (as viewed in FIG. 1) also serving to delineate a compartment for the previously noted motor 24, such compartment being designated 34 in FIG. 1. Similarly, the right wall 20g delineates still another compartment 36 suitable for a heater (not shown) or other such auxiliary apparatus for the aquarium tank 22.

Within the filter assembly compartment 32, the upper surface of the container bottom wall 20c has integrally molded mounting members 38, 40 at opposite ends which respectively are shaped with shoulders serving as seats 42 for the filter assembly 26. Additionally, the bottom wall 20c has an inlet opening 32a which accommodates in a force fit an inlet tube 44 having an upper end extending into the compartment 32 and, at the opposite end of the compartment 32 and as clearly shown in FIG. 2, has a series of three outlet openings 32b connected between the filter assembly compartment 32 and the tank interior 22b. Completing the construction of the auxiliary container 20 is a cover 20h having laterally extending from opposite sides of its back edge projections for making a pivotal connection as at 20j, to the sidewalls 20a. Cover 20h includes a centrally located oval opening 20k which serves to hold the filter assembly 26 in place, all as will now be described in detail.

The filter assembly 26, in the illustrated embodiment, consists of a generally rectangular container formed by sidewalls 26a and a bottom wall 26b, and further includes a cover 32c having a raised central portion 32d, in the shape of an oval, which extends through the container cover oval opening 20k and effectively holds the filter assembly 26 firmly in place within the compartment 32. Further, filter assembly 26 in its seated position in the compartment 32 has its bottom wall 26b mounted on the seats 42 in a clearance position from the upper surface of the container bottom wall 20c thereby defining, as best shown in FIG. 9, a water passage 46 leading to the outlet openings 32b. In this seated position, an inlet opening 41 is so located in bottom wall 26b as to align with and thereby accommodate the upper extending end of the previously noted inlet tube 44, all as is illustrated in FIGS. 1, 9. Disposed in a force fit in the upper end of the inlet opening 41 is a spray nozzle 46 having an appropriate curvature at its upper free end and as to direct the dirt-laden water delivered from the tank 22 for filtering through the filter assembly 26 first against the cover 32c of the assembly. This spraying of the water has been found to increase aeration and also to disperse the debris content of the water somewhat evenly over the conventional filter material M, which is placed along the bottom of the container 26a, the dispersed dirt-laden water draining through the filtering material M and thereafter passing through plural outlet openings 32e which open into the fluid passage 46.

As best shown in FIG. 2, the fluid connection from the pump 24 to the filter assembly 26 includes a flexible connector 48 which joins the pump outlet 28c to an L-shaped conduit 50 which at its opposite end is appropriately inserted in a cylindrical member 201 depending from the bottom wall 20c and in which member the previously noted inlet tube 44 is also connected.

From the foregoing it should be readily appreciated that there has been described an efficiently operating water-filtering system compactly arranged in the auxiliary container 20. The operation of this system is commenced with the operation of the motor 24 which is effective in causing the pumping of the water through the inlet conduit 30, through the conduits 28c, 48, 50 and into the filter assembly 26 occupying a seated position within the filter compartment 32. More particularly, the pumped water is delivered into the filter assembly 26 through the aligned inlet tube 44 and spray nozzle 46 and is sprayed against the raised oval portion 32d of the filter assembly cover 32c. For this reason, it is preferred that the cover be fabricated out of a clear plastic so that this spray action may be observed as an indication that the filtering system is in operation. The water spray drains, by gravity, through the filtering material M, and passes out of the filter assembly 26 through the openings 32e and flows through the fluid passage 46 for re-entry into the tank 22 through the compartment outlet openings 32b. It is of course contemplated that from time to time it will be necessary to remove the filter assembly 26 from its compartment 32 and fill it with fresh filtering material M. Replacement of the filter assembly 26 in its seated position on the seats 42 automatically achieves the operative fluid connections for the inlet 41 and for the fluid passage 46 to the outlets 32b to again render the water filtration system operational.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. The combination for an aquarium of a tank including walls defining an internal volume serving as said aquarium having an upper opening bounded by the upper peripheral edges of said walls, and a hollow elongated auxiliary container having an operative seated position on said tank upper peripheral edges within said upper opening thereof and having a bottom wall in facing relation to said tank interior volume, said auxiliary container having transverse walls delineating the internal volume thereof into a least a pump compartment and a filter assembly compartment, a pump and pump housing operatively arranged in a depending position from said pump compartment bottom wall into said tank internal volume, said pump housing having an inlet and an outlet in communication with said pump, said filter assembly compartment bottom wall having an inlet thereto and an outlet therefrom in communication with said tank internal volume, a conduit connected from said pump outlet to said filter assembly compartment inlet effective to deliver water for filtering into said filter assembly compartment, and a self-contained filter assembly positionable in said filter assembly compartment having an operative connection to said filter assembly compartment inlet and outlet and having filter material interposed between said operative connections for filtering said water during passage through said filter assembly, said filter assembly including a housing having an upper wall and a spray nozzle mounted therein in communication with said filter assembly inlet operative connection so as to spray said water delivered to said filter assembly against said housing upper wall.

2. An aquarium auxiliary container as defined in claim 1 wherein said filter assembly compartment has upstanding mounting members for seating said filter assembly housing thereon in a clearance position from said compartment bottom wall so as to define a water outlet passage from said filter assembly to said filter assembly compartment outlet.

3. An aquarium auxiliary container as defined in claim 2 wherein said filter assembly compartment inlet comprises an upstanding conduit and said filter assembly housing has an opening in the bottom wall thereof in a location aligning with and accommodating said conduit therein in said seated position of said filter assembly within said filter assembly compartment.

4. The combination for an aquarium of a tank including walls defining an internal volume serving as said aquarium having an upper opening bounded by the upper peripheral edges of said walls, and a hollow elongated auxiliary container having an operative seated position on said tank upper peripheral edges within said upper opening thereof and having a bottom wall in facing relation to said tank interior volume, said auxiliary container having transverse walls delineating the internal volume thereof into at least a pump compartment and a filter assembly compartment, a pump and pump housing operatively arranged in a depending position from said pump compartment bottom wall into said tank internal volume, said pump housing having an inlet and an outlet in communication with said pump, a conduit connected from said pump outlet to said filter assembly compartment effective to deliver water for filtering into said filter assembly compartment, and a self-contained filter assembly having a spray nozzle and cover in facing relation and filter material beneath said cover positionable in said filter assembly compartment with said spray nozzle in fluid communication with said conduit from said pump outlet, whereby water delivered into said filter assembly is first sprayed against said cover before draining through said filter material.